(12) United States Patent
McSheffrey, Jr. et al.

(10) Patent No.: US 7,174,783 B2
(45) Date of Patent: *Feb. 13, 2007

(54) REMOTE MONITORING OF FLUID CONTAINERS

(75) Inventors: John J. McSheffrey, Jr., Needham, MA (US); Brendan T. McSheffrey, Newton, MA (US); James P. O'Shea, Riverside, RI (US)

(73) Assignee: MIJA Industries, Inc., Rockland, MA (US)

( * ) Notice: Subject to any disclaimer, the term of this patent is extended or adjusted under 35 U.S.C. 154(b) by 43 days.

This patent is subject to a terminal disclaimer.

(21) Appl. No.: 10/899,917

(22) Filed: Jul. 26, 2004

(65) Prior Publication Data

US 2005/0056090 A1   Mar. 17, 2005

Related U.S. Application Data

(63) Continuation-in-part of application No. 10/024,431, filed on Dec. 18, 2001, now Pat. No. 6,766,688, and a continuation-in-part of application No. 10/782,288, filed on Feb. 19, 2004, which is a continuation-in-part of application No. 10/274,606, filed on Oct. 21, 2002, which is a continuation-in-part of application No. 09/832,531, filed on Apr. 11, 2001, now Pat. No. 6,585,055, which is a continuation-in-part of application No. 09/212,121, filed on Dec. 15, 1998, now Pat. No. 6,302,218, which is a continuation of application No. 08/879,445, filed on Jun. 20, 1997, now Pat. No. 5,848,651, and a continuation-in-part of application No. PCT/US97/01025, filed on Jan. 23, 1997, now abandoned, which is a continuation-in-part of application No. 08/590,411, filed on Jan. 23, 1996, now Pat. No. 5,775,430.

(51) Int. Cl.
*G01F 23/00* (2006.01)

(52) U.S. Cl. ............................................ 73/291
(58) Field of Classification Search .................. 73/291
See application file for complete search history.

(56) References Cited

U.S. PATENT DOCUMENTS 922,456 A   5/1909   Casey (Continued)

FOREIGN PATENT DOCUMENTS

DE   3 731 793   3/1989

(Continued)

OTHER PUBLICATIONS

NFPA 10 Standard for Portable Fire Extinguishers, 1998 Edition; Nat'l Fire Protection Assoc., pp. 10.

(Continued)

*Primary Examiner*—Michael Cygan
(74) *Attorney, Agent, or Firm*—Fish & Richardson P.C.

(57) ABSTRACT

Apparatus for remote inspection of fluid containers, e.g., portable tanks, includes an electronic circuit in communication between each container (or at various locations along a pipeline) and a remote central station. The electronic circuit is adapted to issue a signal to the remote central station that includes information about predetermined internal and/or external conditions such as the level of liquid stored in the tank, a pressure condition of material stored in the tank, a lack of presence of the tank in an installed position, or the presence of an obstruction restricting access to the tank.

9 Claims, 12 Drawing Sheets

U.S. PATENT DOCUMENTS

| | | |
|---|---|---|
| 2,670,194 A | 2/1954 | Hansson |
| 3,145,375 A | 8/1964 | Webb |
| 3,333,641 A | 8/1967 | Hansom |
| 3,664,430 A | 5/1972 | Sitabklhan |
| 3,735,376 A | 5/1973 | Kermer |
| 3,946,175 A | 1/1977 | Weise |
| 4,003,048 A | 1/1977 | Weise |
| 4,015,250 A | 3/1977 | Fudge |
| 4,034,697 A | 7/1977 | Russell |
| 4,051,467 A | 9/1977 | Galvin |
| 4,100,537 A | 7/1978 | Carlson |
| 4,101,877 A | 7/1978 | Osborne |
| 4,125,084 A | 11/1978 | Salmonsen |
| 4,143,545 A | 3/1979 | Sitabkhan |
| 4,184,377 A | 1/1980 | Hubbard |
| 4,279,155 A | 7/1981 | Balkanli |
| 4,289,207 A | 9/1981 | Wernert |
| 4,303,395 A | 12/1981 | Bower |
| 4,342,988 A | 8/1982 | Thompson et al. |
| 4,360,802 A | 11/1982 | Pinto |
| 4,418,336 A | 11/1983 | Taylor |
| 4,419,658 A | 12/1983 | Jarosz |
| 4,531,114 A | 7/1985 | Topol |
| 4,548,274 A | 10/1985 | Simpson |
| 4,586,383 A | 5/1986 | Blomquist |
| 4,599,902 A | 7/1986 | Gray |
| 4,613,851 A | 9/1986 | Hines |
| 4,697,643 A | 10/1987 | Sassier |
| 4,805,448 A | 2/1989 | Armell |
| 4,823,116 A | 4/1989 | Kitchen, III et al. |
| 4,835,522 A | 5/1989 | Andrejasich et al. |
| 4,866,423 A | 9/1989 | Anderson |
| 4,887,291 A | 12/1989 | Stillwell |
| 4,890,677 A | 1/1990 | Scofield |
| 4,928,255 A | 5/1990 | Brennecke et al. |
| 4,979,572 A | 12/1990 | Mikulec |
| 5,153,567 A | 10/1992 | Chimento |
| 5,224,051 A | 6/1993 | Johnson |
| 5,357,242 A | 10/1994 | Morgano |
| 5,460,228 A | 10/1995 | Butler |
| 5,475,614 A | 12/1995 | Tofte et al. |
| 5,486,811 A | 1/1996 | Wherle |
| 5,534,851 A | 7/1996 | Russek |
| 5,578,993 A | 11/1996 | Sitabkhan et al. |
| 5,596,501 A | 1/1997 | Comer et al. |
| 5,613,778 A | 3/1997 | Lawson |
| 5,652,393 A | 7/1997 | Lawson |
| 5,706,273 A | 1/1998 | Guerreri |
| 5,775,430 A | 7/1998 | McSheffrey |
| 5,781,108 A | 7/1998 | Jacob |
| 5,793,280 A | 8/1998 | Hincher |
| 5,848,651 A | 12/1998 | McSheffrey |
| 5,853,244 A | 12/1998 | Hoff et al. |
| 5,864,287 A | 1/1999 | Evans |
| 5,877,426 A | 3/1999 | Hay |
| 5,936,531 A | 8/1999 | Powers |
| 5,952,919 A | 9/1999 | Merrill |
| 6,014,307 A | 1/2000 | Crimmins |
| 6,114,823 A | 9/2000 | Doner |
| 6,125,940 A | 10/2000 | Oram |
| 6,155,160 A | 12/2000 | Hochbrueckner |
| 6,168,563 B1 | 1/2001 | Brown |
| 6,240,365 B1 | 5/2001 | Bunn |
| 6,270,455 B1 | 8/2001 | Brown |
| 6,289,331 B1 | 9/2001 | Pedersen et al. |
| 6,302,218 B1 | 10/2001 | McSheffrey et al. |
| 6,311,779 B2 | 11/2001 | McSheffrey |
| 6,317,042 B1 | 11/2001 | Engelhorn et al. |
| 6,336,362 B1 | 1/2002 | Duenas |
| 6,351,689 B1 | 2/2002 | Carr et al. |
| 6,357,292 B1 | 3/2002 | Schultz et al. |
| 6,401,713 B1 | 6/2002 | Hill et al. |
| 6,450,254 B1 | 9/2002 | Hoyle et al. |
| 6,488,099 B2 | 12/2002 | McSheffrey et al. |
| 6,496,110 B2 | 12/2002 | Peterson et al. |
| 6,542,076 B1 | 4/2003 | Joao |
| 6,585,055 B2 | 7/2003 | McSheffrey et al. |
| 6,587,049 B1 | 7/2003 | Thacker |
| 6,598,454 B2 | 7/2003 | Brazier et al. |
| 6,646,545 B2 | 11/2003 | Bligh |
| 6,772,260 B2 * | 8/2004 | Kawase et al. ............. 710/264 |
| 6,856,251 B1 | 2/2005 | Tietsworth et al. |
| 2003/0071736 A1 | 4/2003 | Brazier et al. |
| 2003/0116329 A1 | 6/2003 | McSheffrey |
| 2003/0135324 A1 | 7/2003 | Navab |

FOREIGN PATENT DOCUMENTS

| | | |
|---|---|---|
| FR | 2 340 109 | 9/1977 |
| FR | 2 515 845 | 5/1983 |
| FR | 2 676 931 | 12/1992 |
| WO | WO 81/02484 | 9/1981 |
| WO | WO 94/11853 | 5/1994 |
| WO | WO 01/46780 | 6/2001 |
| WO | WO 01/93220 | 12/2001 |
| WO | WO 03/076765 | 9/2003 |
| WO | WO 03/098908 | 11/2003 |

OTHER PUBLICATIONS

Int'l Search Report PCT/US02/11401.

Cole-Parmer Brochure, "Exciting New Products for Measuring Flow and Pressure," Canada, received Apr. 23, 1996, 1 page.

Press Release, "Help That comes Too Late Is As Good As No Help At All—The Fire Extinguisher Alarm System Gives Immediate Help", Undated, Invention Technologies, Inc.

* cited by examiner

REMOTE MONITORING OF FLUID CONTAINERS

This application is a continuation-in-part of U.S. application Ser. No. 10/024,431, filed Dec. 18, 2001 now U.S. Pat. No. 6,766,688, and U.S. application Ser. No. 10/782,288, filed Feb. 19, 2004, now pending, which is a continuation-in-part of U.S. application Ser. No. 10/274,606, filed Oct. 21, 2002, now pending, which is a continuation-in-part of U.S. application Ser. No. 09/832,531, filed Apr. 11, 2001, now U.S. Pat. No. 6,585,055, issued Jul. 1, 2003, which is a continuation-in-part of U.S. application Ser. No. 09/212,121, filed Dec. 15, 1998, now U.S. Pat. No. 6,302,218, issued Oct. 16, 2001, which is a continuation of U.S. application Ser. No. 08/879,445, filed Jun. 20, 1997, now U.S. Pat. No. 5,848,651, issued Dec. 15, 1998, which is a continuation-in-part of U.S. application Ser. No. 08/590,411, filed Jan. 23, 1996, now U.S. Pat. No. 5,775,430, issued Jul. 7, 1998, and a continuation-in-part of International Application No. PCT/US97/01025, with an International Filing Date of Jan. 23, 1997, now abandoned.

TECHNICAL FIELD

This disclosure relates to remote monitoring of tanks and other fluid containers.

BACKGROUND

Fluid containers such as portable oxygen tanks are often used in hospitals, nursing homes, and other healthcare facilities for use in medical procedures and patient recovery. Gauges are typically attached to the oxygen tanks to permit healthcare personnel to monitor tank contents including for malfunctions and contents depletion. Fluid containers are also used in industrial and commercial facilities, e.g., for storage of volatile and non-volatile fluids such as propane gas, nitrogen gas, hydraulic fluid, etc. under pressure for use in industrial manufacturing, processing, and fabrication. Similarly, fluid containers are used in commercial and domestic locations, including for cooking and other food preparation procedures as well as for heating.

SUMMARY

In one aspect, the invention features apparatus for remote inspection of a portable tank located in an installed position and adapted to store a liquid material that includes a first detector (e.g., a float gauge) in communication with the liquid material for measurement of a level of liquid material stored in the portable tank and a second detector (e.g., an electronic tether) configured to detect lack of presence of the portable tank from its installed position. The apparatus also includes an electronic circuit in communication between the first and second detectors and a central station located remotely from the tank. The electronic circuit is configured to issue a signal (e.g., a wireless signal) to the central station that includes information about the level of liquid material stored in the portable tank or presence of the portable tank in its installed position.

In one particular implementation, the electronic circuit is configured to issue a signal to the central station upon detection of a lack of presence of the portable tank from its installed position. The electronic circuit may also be configured to continuously or periodically issue a signal to the display device that includes information about the level of liquid material. Alternatively, the electronic circuit may be configured to issue a signal to the display device upon detection of a liquid level at or below a predetermined threshold.

In another implementation, the apparatus also includes a third detector configured to detect presence of an obstruction restricting access to the tank and the electronic circuit is configured to issue a signal that includes information about the presence of an obstruction restricting access to the tank.

In another aspect, the invention features a system for remote inspection of a portable tank configured to store volatile material that is stored as a liquid under pressure and released from the tank in gaseous form (e.g. propane). The system includes a detector in communication with the liquid material for measurement of the level of the liquid fuel material stored in the tanks, a display device located remotely from the detector, and an electronic circuit in communication between the detector and the display device. The electronic circuit is configured to issue a wireless signal that includes information about the level of liquid material, and the portable display device is configured to receive the wireless signal and display information about the level of liquid material.

Various implementations may include one or more of the following features. The electronic circuit may be configured to continuously or periodically issue the wireless signal to the display device, or, alternatively, may be configured to issue the wireless signal to the display device upon detection of a liquid level at or below a predetermined threshold. The display device may be a portable device such as a personal data assistant, cell phone, laptop computer, etc. or a non-portable device such as a desktop computer.

The detector may comprise a float member that exends into the tank and floats in the liquid, a float magnet joined to an upper portion of the float member, an elongated shaft positioned at an upper end of the tank such that the upper portion of the float member is telescopically engaged with the elongated shaft, a fluid impermeable, non-magnetic wall disposed between the upper portion of the float member and the elongated shaft, and a liquid level indication magnet positioned to couple with the float magnet across the fluid impermeable wall for axial positioning of the shaft in response to axial positioning of the float member such that the axial position of the shaft indicates the tank liquid level. The detector may also include a transducer configured to generate an electrical signal that contains information about the position of the liquid level indication magnet.

In one particular implementation, the system also includes a second electronic circuit configured to issue a signal including information about the level of fuel to a communications device associated with a refueling company. The second electronic circuit may be configured to issue the signal to the communications device associated with a refueling company upon detection of a fuel level at or below a predetermined threshold. The second electronic circuit may also be configured to receive input indicating a user's desire for additional fuel, and issues a signal to a communications device associated with a refueling company in response to receiving input indicating a user's desire for additional fuel. The second electronic circuit may be configured to retrieve pricing information via, e.g., the Internet or telephone, from one or more refueling companies.

In another aspect, the invention features a system for remote inspection of a tank configured to store heating oil that includes a detector in communication with the heating oil for measure of the liquid level of the heating oil stored in the tank, a display device located remotely from the detector, and an electronic circuit in communication therebetween. The electronic circuit is configured for issue of a signal (e.g. wireless signal) that includes information about the level of fuel, and the display device is configured to receive the signal and display information about the level of fuel.

Various implementations may include one or more of the following features. The electronic circuit may be configured to continuously or periodically issue the wireless signal to the display device, or, alternatively, may be configured to issue the wireless signal to the display device upon detection of an oil level at or below a predetermined threshold.

The display device may be a portable device such as a personal data assistant, cell phone, laptop computer, etc. or a non-portable device such as a desktop computer. The detector may includes a float gauge and a transducer configured to generate an electrical signal that contains information about the position of the float gauge.

In one particular implementation, the system also includes a second electronic circuit configured to issue a signal including information about the level of oil to a communications device associated with a refueling company. The second electronic circuit may be configured to issue the signal to the communications device associated with a refueling company upon detection of an oil level at or below a predetermined threshold. The second electronic circuit may also be configured to receive input indicating a user's desire for additional oil, and issues a signal to a communications device associated with a refueling company in response to receiving input indicating a user's desire for additional oil. The second electronic circuit may be configured to retrieve pricing information via, e.g., the Internet or telephone, from one or more refueling companies. The second electronic circuit may be configured to receive input from a user via, e.g., a key pad, graphical user interface, keyboards, etc., that includes information about one or more refueling company.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 2:
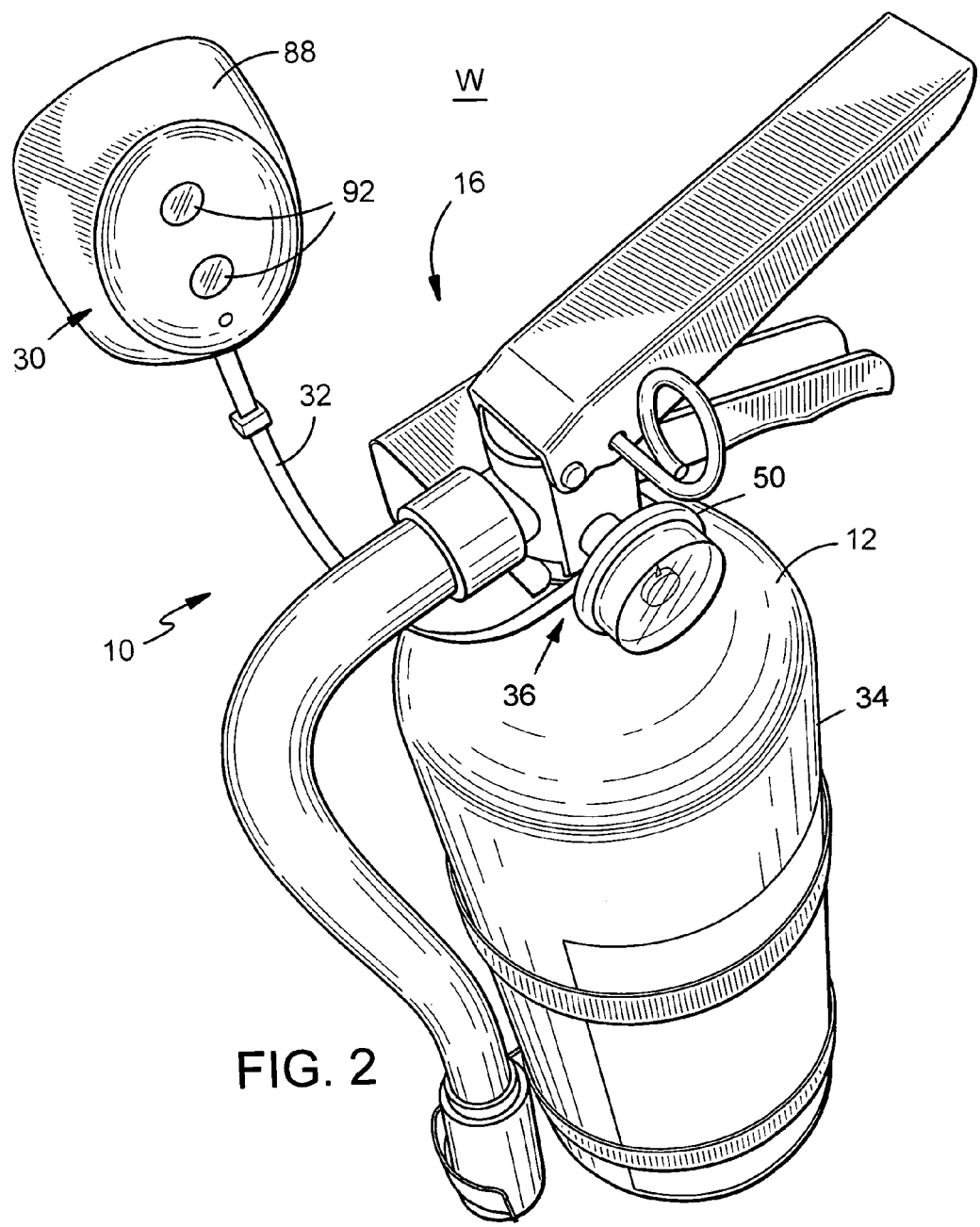
FIG. 2 is a perspective view of a fire extinguisher mounted at a fire extinguisher station for remote inspection.

As an example of a remote inspection apparatus 10, in FIG. 2, a portable fire extinguisher 12 is shown mounted to a wall, post, or other support surface, W, at a fire extinguisher station 16 in a system of fire extinguisher stations 14, as described in U.S. patent application Ser. No. 10/274,606, filed Oct. 21, 2002, now pending, which is a continuation-in-part of U.S. application Ser. No. 09/832,531, filed Apr. 11, 2001, now U.S. Pat. No. 6,585,055, which is a continuation-in-part of U.S. application Ser. No. 09/212,121, filed Dec. 15, 1998, now U.S. Pat. No. 6,302,218, issued Oct. 16, 2001, which is a continuation of U.S. application Ser. No. 08/879,445, filed Jun. 20, 1997, now U.S. Pat. No. 5,848,651, issued Dec. 15, 1998, which is a continuation-in-part of U.S. application Ser. No. 08/590,411, filed Jan. 23, 1996, now U.S. Pat. No. 5,775,430, issued Jul. 7, 1998, and a continuation-in-part of International Application No. PCT/US97/01025, with an International Filing Date of Jan. 23, 1997, now abandoned, the complete disclosures of all of which are incorporated herein by reference. Additionally, portions of the apparatus 10 are described in U.S. patent application Ser. No. 08/638,343, filed Apr. 26, 1996, now U.S. Pat. No. 5,834,651, issued Nov. 10, 1998, which is a divisional of U.S. application Ser. No. 08/403,672, filed Mar. 14, 1995, now abandoned, the complete disclosures of all of which are incorporated herein by reference. Additionally, portions of the apparatus 10 are described in U.S. patent application Ser. No. 10/024,431, filed Dec. 18, 2001, now allowed, which claims priority of U.S. Provisional Application No. 60/256,372, filed Dec. 18, 2000, now expired, the complete disclosures of all of which are incorporated herein by reference. Additionally, portions of the apparatus 10 are described in U.S. patent application Ser. No. 09/988,852, filed Nov. 19, 2001, now U.S. Pat. No. 6,488,099, issued Dec. 3, 2002, which is a divisional of the U.S. application Ser. No. 09/832,531, filed Apr. 11, 2001, now U.S. Pat. No. 6,585,055, issued Jul. 1, 2003, the complete disclosures of all of which are incorporated herein by reference. Additionally, portions of the apparatus 10 are described in International application No. PCT/US02/11401, with an International Filing Date of Apr. 4, 2002, now pending, which claims priority of the U.S. application Ser. No. 09/832,531, filed Apr. 11, 2001, now U.S. Pat. No. 6,585,055, the complete disclosures of all of which are incorporated herein by reference. Additionally, portions of the apparatus 10 are described in U.S. patent application Ser. No. 09/742,733, filed Dec. 20, 2000, now U.S. Pat. No. 6,311,779, issued Nov. 6, 2001, the complete disclosure of which is incorporated herein by reference.

As shown in FIG. 2, the portable fire extinguisher 12 typically includes a fire extinguisher tank 34 containing a fire extinguishing material, e.g., water, dry chemical or gas, and a fire extinguisher valve assembly 36 (e.g. as available from MIJA Industries Inc., of Rockland, Mass.) mounted to releasably secure an opening in the tank. The valve assembly 36 further includes a gauge 50 (e.g., a Bourdon coiled tubing gauge of the type also available from MIJA Industries Inc.) to provide indication of the pressure status of fire extinguishing material within the fire extinguisher tank 34. A Hall effect sensor is included in the gauge 50 and is adapted to provide a signal as the extinguisher tank 34 contents approach a low pressure limit or a high pressure limit, as described in U.S. patent application Ser. No. 10/274,606, filed Oct. 21, 2002.

In this implementation, the fire extinguisher 12 at each fire extinguisher station 16 is releasably connected to a docking station 30 by an electronics and communications tether 32 that transfers signals between the fire extinguisher 12 and the docking station 30 along with initiating a signal sent by the docketing station to the remote central station 26 (shown in FIG. 1) based on movement of the extinguisher as also described in U.S. patent application Ser. No. 10/274,606, filed Oct. 21, 2002. Signals initiated from the gauge 50 and through the tether 32, to the docking station 30 and remote central station 26 (shown in FIG. 1), provide an indication of out-of-range (low or high) pressure in the tank 34.

Figure 1:
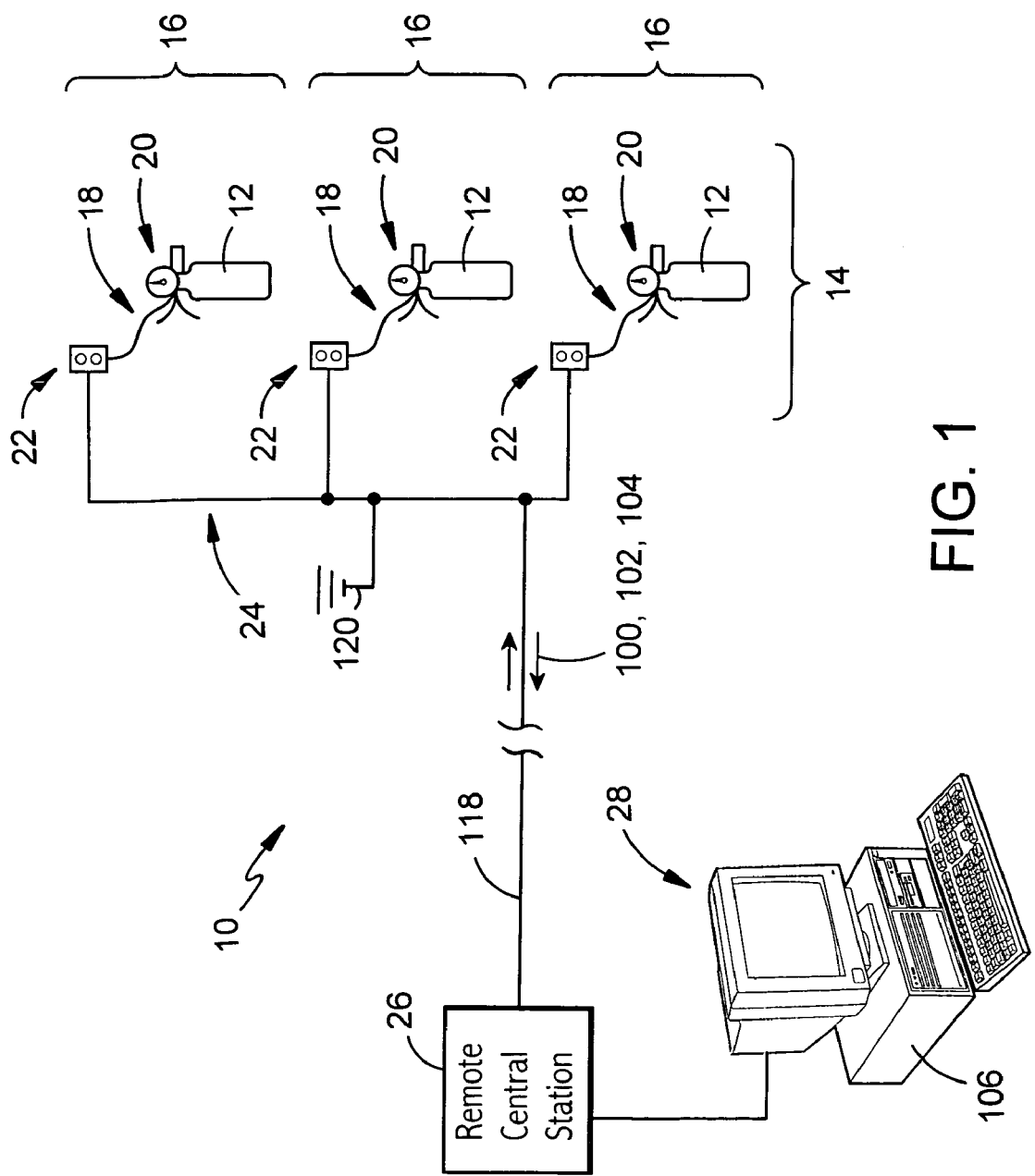
FIG. 1 is a somewhat diagrammatic view of an apparatus for remote inspection of portable pressurized tanks distributed at a system of stations, in this embodiment, fire extinguishers are distributed at a system of fire extinguisher stations.

The length of the tether 32, and the tenacity of engagement of the tether between the docking station 30 and the fire extinguisher 12 is preferably selected so that any significant movement of the fire extinguisher 12 relative to its installed position, i.e., the position in which it is placed at installation by a fire extinguisher professional, whether removal, or, in a preferred implementation, merely upon rotation with movement in excess of a predetermined threshold value, will result the tether releasing from the fire extinguisher 12, breaks communication between the gauge 50 and the docking station 30, and initiating a signal to the remote central station 26 (shown in FIG. 1).

In the implementation shown in FIG. 2, the docking station 30 is fixedly mounted to the wall, W, at a predetermined position. The docking station 30 consists of a housing 88 containing a sonar module (not shown) and defining spaced apertures or windows 92 through which the module emits and receives ultrasonic signals. Also, disposed within the docking station housing 88 is an electronic and communications circuit (not shown) that transmits and receives signals to and from the connected fire extinguisher 12 and the remote central station 26 (shown in FIG. 1), as described more fully in U.S. application Ser. No. 10/274,606, filed Oct. 21, 2002.

Referring again to FIG. 1, the circuitry contained in docking station housing 88 (shown in FIG. 2) issues a signal 100 or a signal 102 upon detection of a predetermined external condition, e.g., lack of presence of the fire extinguisher 12 at its installed position at the fire extinguisher station 16, when the fire extinguisher 12 is removed from, or moved within the respective station, thereby disengaging the tether 32 (shown in FIG. 2) from its connection to the respective fire extinguisher 12, and disrupting the closed connection (signal 100), or an obstruction to viewing of or access to a fire extinguisher station 16 (signal 102). The docking station housing 88 circuitry also issues a signal 104 upon detection of a predetermined internal condition, e.g., existence of an out-of-range, e.g., low, pressure condition of the fire extinguishing material contained within the fire extinguisher tank 34 (shown in FIG. 2).

According to one implementation, the signals 100, 104 are communicated between the fire extinguisher 12 and the electronics and communications circuitry within docking station 30 though the connected tether 32. The signal 100 indicating lack of presence of the fire extinguisher 12 in its installed position at the fire extinguisher station 16 and signal 104 indicating that pressure of the fire extinguishing material in the fire extinguisher tank 34 is below the predetermined minimum pressure level, e.g., indicative of a discharge, leak or other malfunction (or, in an implementation with a pair of Hall Effect sensors above a predetermined maximum pressure level) are received by circuitry within the docking station 30 and transmitted via hardwire connection 118 to the remote central station 26. However, it is contemplated that, in other implementations, signals 100, 102, 104 may be communicated, e.g., via RF (or other) wireless communication circuitry via antennae 120 (FIG. 1) to an RF monitoring system receiver, e.g., at the remote central station 26, or simultaneously, via both hardwire and wireless, to a remote central station 26, or other monitoring station. Also, in some implementations wireless communication circuitry and antenna 120 (FIG. 1) are located within the housing 88 to communicate by wireless signal between the fire extinguisher 12 and the previously mentioned RF monitoring system receiver, e.g., at the remote central station 26. Signals 100, 102 are communicated by wireless signal between the remote central station 26 (FIG. 1) and the fire extinguisher station 16 upon detecting the previously mentioned predetermined external conditions. Signals, such as signal 104, are also communicated by wireless signal upon detection of the previously mentioned predetermined internal conditions. In this manner, a system of fire extinguishers, distributed over a considerable area, are maintained in wireless communication with the remote central station 26.

Figure 3:
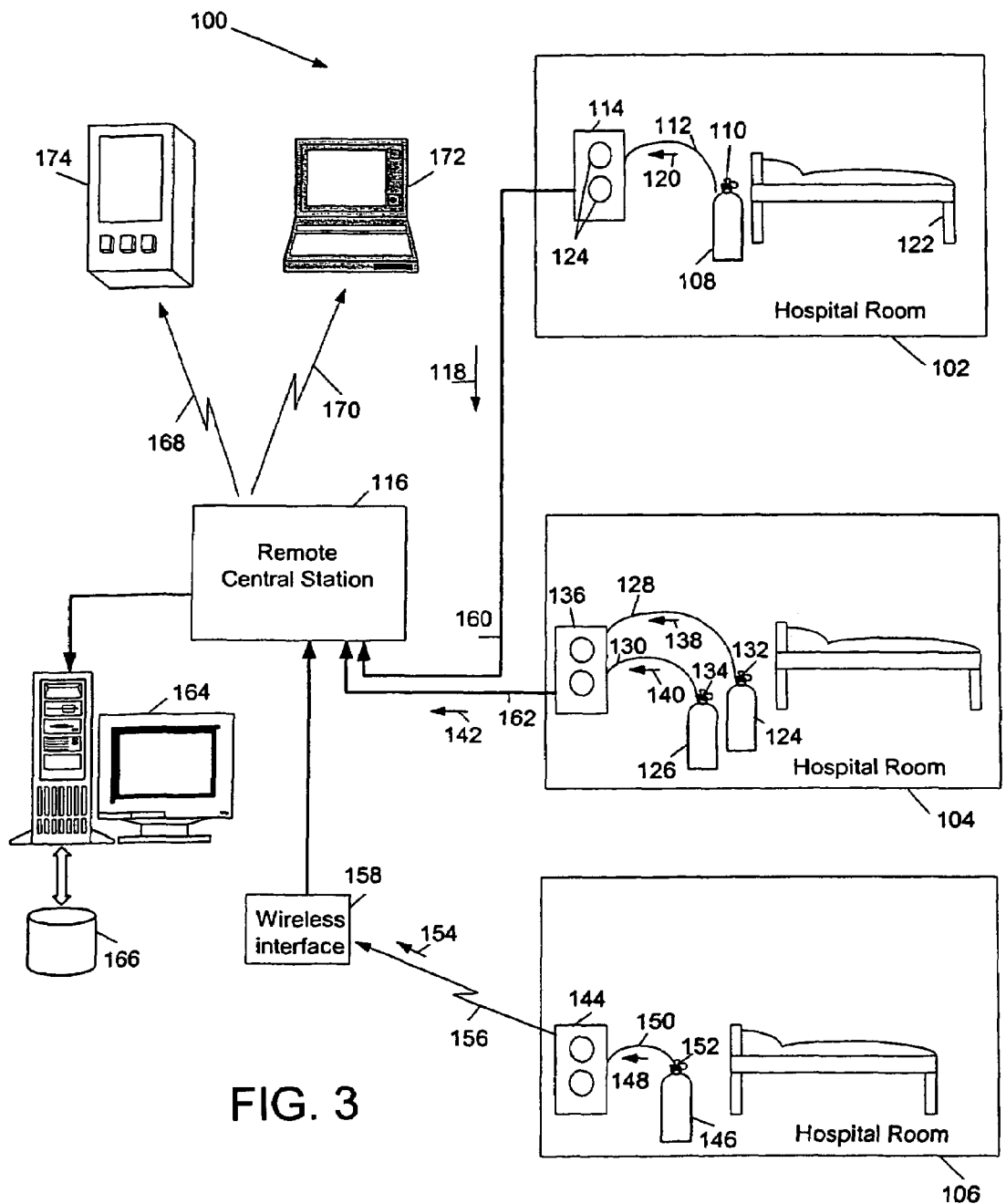
FIG. 3 is a somewhat diagrammatic view of an apparatus of the invention for remote inspection of oxygen tanks at a healthcare facility.

Referring to FIG. 3, in another implementation, an apparatus 100 for remote inspection of portable tanks includes means for monitoring the contents of oxygen tanks distributed throughout locations (e.g., rooms) associated with a healthcare facility such as a hospital, assisted living facility, or a nursing home. However, in other implementations, the apparatus 100 includes means for monitoring the contents of oxygen tanks, or other similar portable tanks, distributed throughout one or more residential homes for assisting in healthcare. Typically, one or more oxygen tanks is located throughout a facility for treatment of the current occupants of the healthcare facility. Portions of apparatus 100 are described in U.S. application Ser. No. 10/782,288, filed Feb. 19, 2004, the complete disclosure of which is incorporated herein by reference.

In the example shown in FIG. 3, oxygen tanks are located in three hospital rooms 102, 104, 106. In hospital room 102, an oxygen tank 108 includes a gauge 110 for monitoring the contents of the oxygen tank, such as by measuring and displaying the pressure of contained oxygen. Similar to the gauge 50 used with the fire extinguisher 12 shown in FIG. 2, the gauge 110 is in communication with an electronic tether 112 connected to a docking station 114 that includes circuitry for transmitting a signal 118 to a remote central station 116 based on a signal 120 received from the electronic tether. The signal 118 received at the remote central station 116 communicates to hospital personnel information on the internal conditions of the oxygen tank 108 as measured by the gauge 110. For example, an alert is issued if the internal pressure the oxygen tank 108 falls below a predetermined threshold so that replacement of the tank or replenishment of the oxygen can be scheduled. Also similar to the apparatus 10 shown in FIG. 1, the signal 118 may also include information representing one or more external conditions (e.g., removal of the oxygen tank, obstructed access to the oxygen tank, etc.) associated with the oxygen tank

108. For example, a sonar module, enclosed in the docking station 114, similar to the sonar module described in conjunction with FIG. 2, transmits and receives ultrasonic signals through apertures 124 to detect objects obstructing access to the oxygen tank 108, such as a bed 122.

In some embodiments, multiple oxygen tanks, or a combination of two or more tanks containing different fluids may be present in a hospital room, as shown in hospital room 104. In this arrangement, oxygen tanks 124, 126 are attached to respective gauges 132, 134 connected by respective electronic tethers 128, 130 to communicate signals from the respective gauges. Circuitry included in a docking station 136 connects to each electronic tether 128, 130 and combines (e.g., multiplexes) signals 138, 140, received from the respective oxygen tanks 124, 126, which may include information associated with the internal conditions of each tank. Additionally, the circuitry in the docking station 136 combines information associated with external conditions (e.g., obstruction detected by a sonar module included in docking station 136) of the tanks 126, 124 with the information from the respective gauges 132, 134. Once the information is combined, a signal 142 is transmitted from the docking station 136 to the remote central station 116. In some embodiments the circuitry included in the docking station 136, or included in each gauge 132, 134, may also encode tank identification information in the signal 142, thereby permitting the remote central station 116 to differentiate between the two tanks as to the source of the transmitted signal 142.

In other embodiments, wireless signal transmission and reception circuitry (e.g., an RF circuit, antenna, etc.) may be incorporated into a docking station 144 for transmission of wireless signals between a hospital room and the remote central station 116. As shown in hospital room 106, a wireless signal 154 containing information associated with internal and external conditions of an oxygen tank 146 is transmitted from the hospital room over a wireless link 156. In hospital room 106, a docking station 144 receives a signal 148 from an electronic tether 150 connected to a gauge 152 attached to the oxygen tank 146. Wireless signal transmission circuitry in the docking station 144 transmits the signal 154 over the wireless link 156 to a wireless interface 158 that receives the wireless signal and communicates the information contained in the signal to the remote central station 116. As with hospital rooms 102 and 104, information received by the remote central station 116 includes information associated with internal conditions (e.g., internal pressure) and external conditions (e.g., obstruction) of the oxygen tank 146 to alert hospital personnel to internal and/or external conditions of the oxygen tank along with information collected from the other oxygen tanks 108, 124, 126 in each of the other hospital rooms 102, 104.

Each docking station 114, 136, 144 is connected by a hardwire connection 160, 162 or a wireless link 156 so that information associated with each oxygen tank is received by the remote central station 116. In some embodiments the hardwire connections 160, 162 are included in a communication network (e.g., a local area network, LAN, or a wide area network, WAN, etc.) to transmit the respective signals 118, 142 to the remote central station 116. With reference to hospital room 106, in some embodiments, the wireless interface 158 may receive the signal 154 over wireless link 156 and use additional wireless links (e.g., cellular links, satellite links, etc.) to transfer the internal and external conditions of the oxygen tank 146 to the remote central station 116. Also, in some embodiments, a combination of wireless links and hardwire connections can be used to transmit the signals from oxygen tanks 108, 124, 126, 146 to the remote central station 116.

After the signals are received at the remote central station 116 from the hospital rooms 102, 104, 106, the information included in the received signals is sorted and displayed by a computer system 164 to alert hospital personnel as to the internal and external conditions associated with each oxygen tank 108, 124, 126, 146. The computer system 164 also stores the received and sorted information on a storage device 166 (e.g., a hard drive, CD-ROM, etc.) for retrieval at a future time for further processing and reporting. In some embodiments the remote central station 116 may include wireless transmission and reception circuitry for transmitting and receiving wireless signals. For example, wireless circuitry (e.g., RF circuitry, antenna, etc.) included in the remote central station 116 can be used to transmit information over wireless links 168, 170 to wireless devices such as a laptop computer 172, a personal digital assistant (PDA) 174, or other similar wireless device (e.g., a cellular phone). Transmission of the information to wireless devices provides hospital personnel not located at the remote central station 116 with information on the condition of the oxygen tanks 108, 124, 126, 146 and an alert to any problems (e.g., tank pressure in hospital room 102 as fallen below a predetermined threshold) associated with one or more of the oxygen tanks. By providing wireless access to the information collected at the remote central station 116, the response time of hospital personnel to one or more of hospital rooms can be reduced.

Figure 4:
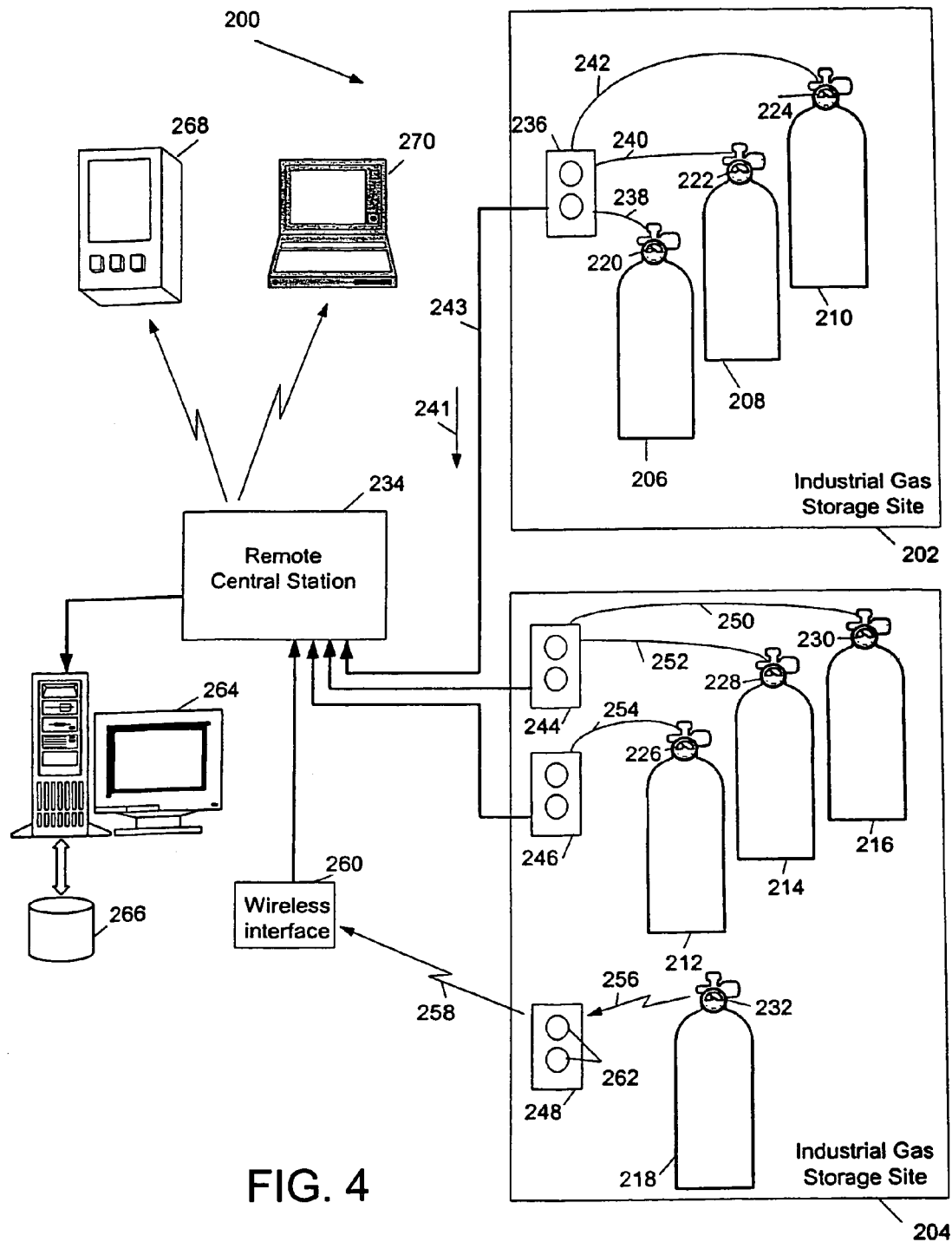
FIG. 4 is a somewhat diagrammatic view of an apparatus for remote inspection of industrial tanks at an industrial tank storage facility.

Referring to FIG. 4, in another embodiment, an apparatus 200 for remote inspection of portable tanks includes means for monitoring contents of industrial gas tanks 206, 208, 210, 212, 214, 216, 218 stored at industrial gas storage sites 202, 204. Contents of each industrial tank 206, 208, 210, 212, 214, 216, 218 are monitored with respective gauges 220, 222, 224, 226, 228, 230, 232 such that each is capable of initiating a signal to a remote central station 234 to alert storage site personnel to internal conditions (e.g., internal pressure, liquid level) associated with each industrial tank. While industrial gas tanks are shown in this particular implementation, other implementations may remotely monitor internal and/or external conditions in other types of industrial tanks or containers such as those that store non-pressurized liquids (e.g., oil) or materials that are stored under pressure as a liquid and released as a gas (e.g., propane).

Referring again to FIG. 4, in industrial gas storage site 202, three respective gas tanks 206, 208, 210 are stored in communication with a docking station 236 by respective electronic tethers 238, 240, 242 respectively connected to gauges 220, 222, 224 for monitoring the industrial gases in each respective tank. In this particular arrangement, docking station 236 is connected to all three electronic tethers 238, 240, 242, and includes circuitry for combining (e.g., multiplexing) signals from each of the three industrial gas tanks 206, 208, 210 into a single signal 241 that is transmitted over a hardwire 243 to a remote central station 234. Similar to the docking station 114 shown in FIG. 3, external conditions associated with the industrial gas tanks 206, 208, 210 are monitored from the docking station and a signal is initiated by a sonar module included in the docking station 236 when an obstruction is detected. Similar to the docking station 30 shown in FIG. 2, a signal is also initiated from circuitry included in the docking station 236 when the electrical connection between the docking station and any of the electronic tethers 238, 240, 242 is broken.

Industrial gas storage site 204 includes three docking stations 244, 246, 248 that respectively receive signals from the respective gauges 226, 228, 230, 232 monitoring the contents of the respective industrial gas tanks 212, 214, 216, 218. In this particular example, a docking station 244 connects to two gas tanks 214, 216 via respective electronic tethers 250, 252 while another docking station 246 is dedicated to receiving signals from gas tank 212 through electronic tether 254. Similarly, a third docking station 248 at storage site 204 is dedicated to industrial gas tank 218. However, gauge 232 monitoring the contents of industrial gas tank 218 and the associated docking station 248 monitoring the gas tank external conditions each includes wireless transmission and reception circuitry to provide a wireless communication link 256 for transmitting internal conditions of the tank 218 from the gauge 232 to the docking station 248. Similar to the tether 32 (shown in FIG. 2) releasing from the docking station 30 (also shown in FIG. 2), the wireless link 256 also initiates a signal from the docking station 248 if the link is interrupted due to moving of the gas tank 218 from close proximity to the docking station. The wireless transmission and reception circuitry in the docking station 248 also forms a wireless link 258 with a wireless interface 260, so that information encoded in a wireless signal received by the docking station 248 from the gauge 232 is transmitted to the wireless interface, which transfers the information to the remote central station 234. The docking station 248 also uses the wireless link 258 for transmitting information associated with external conditions (e.g., obstruction) of the tank 218, as provided by apertures 262 and a sonar module included in the docking station similar to the previous docking stations described in conjunction with FIG. 1–3.

Similar to the apparatus 100 shown in FIG. 3, the remote central station 234 receives information from each docking station 236, 244, 246, 248 and transfers the information to a computer system 264 for processing (e.g., sorting) and displaying. In this example, storage site personnel are provided with information on internal conditions (e.g., internal tank pressure) and external conditions (e.g., tank obstruction) associated with each tank 206, 208, 210, 216, 214, 216, 218 and alerted to any potential emergencies. The computer system 264 also stores information on a storage device 266 for retrieval at a future time e.g., for further analysis. Also similar to the apparatus 100 (shown in FIG. 3), the remote central station 234 includes wireless transmission and reception circuitry (e.g., RF circuits, antenna, etc.) for wireless transmission and reception of information to a personal digital assistant 268, a laptop computer 270, or other wireless devices (e.g., a cellular phone) so that storage site personnel (or other interested parties) not located at the remote central station 234 can be informed of the internal and external conditions of each tank 206, 208, 210, 216, 214, 216, 218 stored at each respective storage site 202, 204. By transmitting conditions related to each tank to storage site personnel, response times for out-of-standard conditions present at one or both sites 202, 204 (e.g., internal pressure rising to dangerous level in the tank 206, an unscheduled re-locating of the tank 212, etc) may be reduced.

Figure 5:
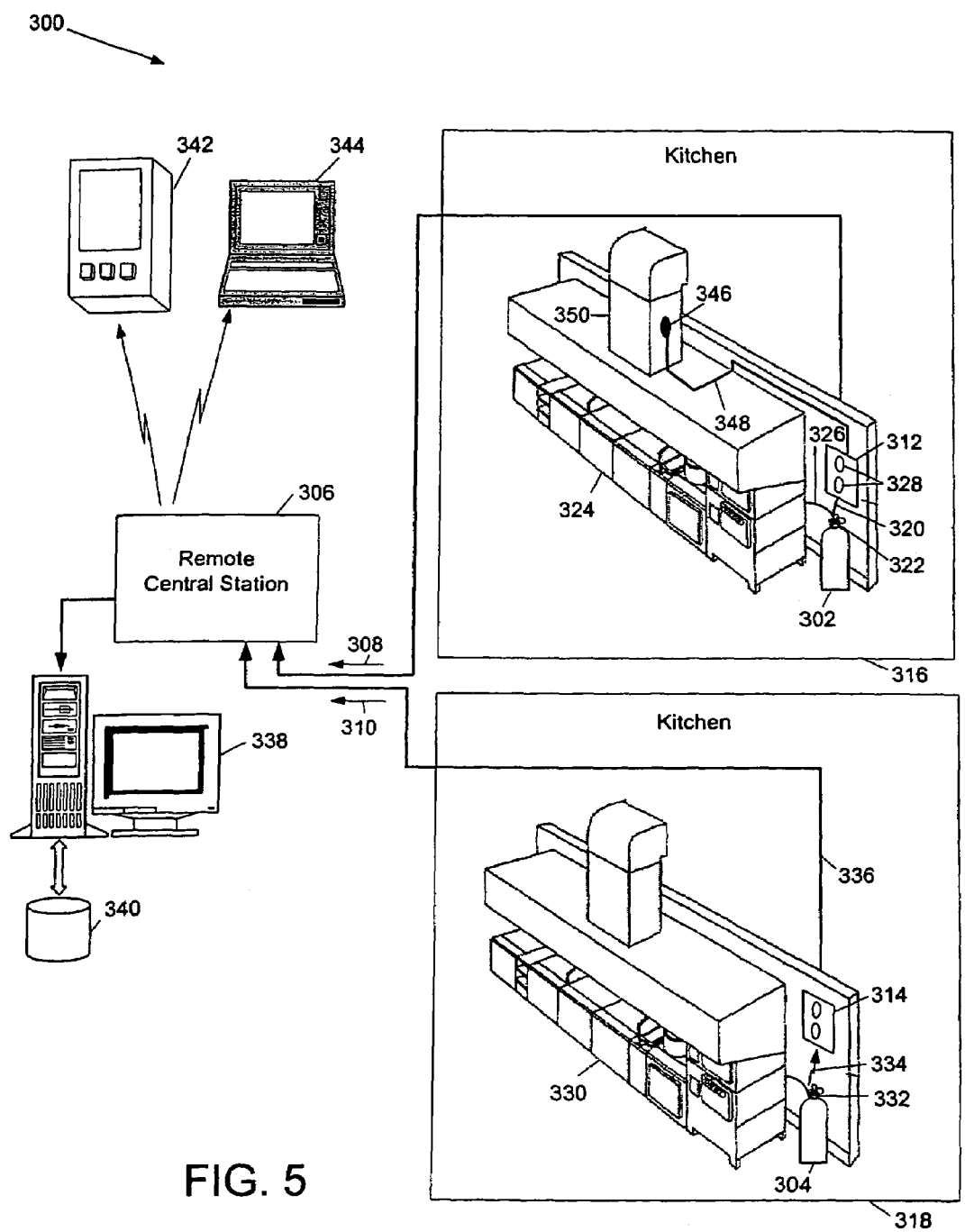
FIG. 5 is a somewhat diagrammatic view of an apparatus for remote inspection of commercial gas tanks at a commercial facility.

Referring to FIG. 5, in another implementation, an apparatus 300 for remote inspection of portable tanks includes means for monitoring contents of tanks 302, 304 used in commercial facilities. In this particular embodiment, a remote central station 306 receives signals 308, 310 from two respective wall-mounted docking stations 312, 314 located in two respective commercial kitchens 316, 318. In kitchen 316 the wall-mounted docking station 312 receives signals through an electronic tether 320 from a gauge 322 monitoring the internal conditions of the tank 302 supplying gas (e.g., propane) to kitchen equipment 324 through a connected gas hose 326. Similar to the docking stations shown in FIG. 2–4, a sonar module in the docking station 312 detects access obstructions to the tank 302 through apertures 328. By monitoring the internal and external conditions associated with tank 302, personnel located at the remote central station 306 can detect when the contents of the tank are nearly exhausted and schedule tank replacement or contents replenishment.

Similar monitoring is performed in kitchen 318 for tank 304 providing gas to kitchen equipment 330. However, in this particular embodiment, a gauge 332 and a docking station 314 each includes wireless transmission and reception circuitry (e.g., RF circuit, antenna, etc) such that the gauge transmits one or more signals encoded with information relating to the internal conditions of tank 304 over a wireless link 334 to the docking station. Upon receiving the one or more signals from the gauge 332, the docking station 314 transmits the signal 310 over a hardwire 336 to the remote central station 306. However, in some embodiments the wireless transmission and reception circuitry included in the docking station 314 and the remote central station 306 allows the signal 310 to be transmitted over a wireless link.

Similar to the apparatus shown in FIG. 3, the remote central station 306 includes a computer system 338 that collects and stores, on a storage device 340, information transmitted to the remote central station and processes (e.g., sorts) the received information such that the remote central station can alert personnel to internal conditions (e.g., internal pressure, liquid level) and external conditions (e.g., access obstructed) associated with each tank 302, 304. Once alerted, the personnel can take appropriate steps based on the internal (e.g., reduce internal pressure in the tank 302, refill tank 302) and/or external (e.g., remove obstructions near the tank 304) conditions detected. Similar to the apparatus 100 shown in FIG. 3, the remote central station 306 includes wireless transmission and reception circuitry (e.g., RF circuits, antenna, etc) for transmitting wireless signals to a PDA 342 and a laptop computer 344, or other wireless devices (e.g., a cellular phone) so that personnel can quickly be alerted to the internal pressure of the tanks 302, 304, obstructions of the tanks, or other internal and external conditions by using these wireless devices.

In some embodiments a flow gauge 346 monitors exhaust gases that propagate through a hood 350 of the kitchen equipment 324 of kitchen 316. A hardwire cable 348 carries one or more signals from the flow gauge 346 to the docking station 312 that sends one or more signals to the remote central station 306 for processing (e.g., sorting) and display of information associated with the exhaust gases (e.g., exhaust flow rate, exhaust volume, etc). However, in some embodiments hardwire cable 348 may be replaced by a wireless link by including wireless transmission and reception circuitry (e.g., RF circuit, antenna, etc.) with the flow gauge 346 such that one or more wireless signals are sent to wireless transmission and reception circuitry in the docking station 312. Similar to the information processed from the tanks 302, 304, information from the flow gauge 346 can be sent from the docking station 312 to the remote central station 306 and then transmitted to wireless devices (e.g., PDA 342, laptop computer 344, etc.) so that personnel can be quickly alerted to abnormal gas exhaust conditions.

In the particular embodiment shown in FIG. 5, the gauges 322, 332 and the docking stations 312, 314 monitor internal and external conditions of the respective tanks 302, 304 and the flow gauge 346 monitors exhaust gases that flow through the hood 350. However, in some embodiments one or more gauges, docking stations, and/or flow gauges can be used individually or in combination to monitor internal and external conditions of a chemical hood and portable chemical tanks that are used in conjunction with the chemical hood. Chemical hoods are often implemented for venting harmful gases used in fabrication processes, manufacturing processes, and other processes that use one or more chemicals stored in portable tanks. By monitoring internal conditions (e.g., internal pressure) of the portable chemical tanks used with the chemical hoods, information collected can be used to alert personnel when internal pressure of a particular chemical tank is low and the tank should be scheduled for replacement. Also, a sonar module in a docking station associated with monitoring of a portable chemical tank can detect if an object is obstructing access to the tank and to quickly alert personnel to this potentially dangerous situation. A flow gauge mounted onto the chemical hood, similar to flow gauge 346 mounted to the hood 350 (shown in FIG. 5), additionally allows monitoring of e.g., the flow rate, volume, and other properties of the exhaust gases. Information collected by the flow gauge and transmitted to a remote central station, can also be stored for future analysis such as for evaluating flow changes over time that may have been caused e.g., by an obstruction in the chemical hood or some other flow reduction source like a malfunctioning exhaust fan.

In this embodiment, a non-contact ultrasonic sensor (sonar module) is employed for detecting the presence of an obstruction. Alternatively, a non-contact optical sensor may be employed. Both have sensitivity over wide ranges of distances (e.g., about 6 inches to about 10 feet, or other ranges as may be dictated, e.g., by environmental conditions). As an obstruction may move slowly, or may be relatively stationary, it may not be necessary to have the sensor active at all times; periodic sampling, e.g., once per hour, may be sufficient. On the other hand, the sonar module in the docking station 312 may also be utilized as a proximity or motion sensor, e.g., in a security system, e.g., to issue a signal to the remote central station 306 and/or to sound an alarm when movement is detected in the vicinity of the portable tank 302 while kitchen 316 is not operating, e.g., after business hours or during weekends or vacations. In this case, continuous operation may be dictated, at least during periods when the security system is active. Other features and characteristics may be optimally employed, as desired, including: wide angle and narrow angle sensitivity, digital output ("Is there an obstruction or not?"), and/or analog output (e.g., "How large an obstruction?" and "How far away from the docking station?").

Gauge 322 may optionally include an electro luminescent light panel that generates a visual signal to passersby, warning of the low-pressure condition of the portable tank 302. In some embodiments, the gauge 322 may include an electronic circuit that causes intermittent illumination of the light panel, thereby to better attract the attention of passersby.

Additionally, the gauge 322 may include an electronic circuit and an audio signaling device for emitting, e.g., a beeping sound, instead of or in addition to the visual signal. The audio signal device may be triggered when internal pressure of the portable tank 302 drops to or below a predetermined level. The audio signal may consist of a recorded information message, e.g., instructions to replace the tank or to replenish the tank contents. The gauge 322 may also include a light sensor, e.g., of ambient light conditions, to actuate illumination of the light panel in low or no light conditions, e.g., to signal the location of the portable tank 302, at night or upon loss of power to external lighting. The gauge 322 may also include a sensor adapted to sense other local conditions, e.g., smoke or fire, to actuate illumination of the light panel and/or audio signal device when smoke or other indications of a fire are sensed, e.g., to signal the location of the tank, when visibility is low.

The gauge 322 may also include electronic circuitry to encode an identification specific to the associated tank 302 for receiving and dispatching signals or messages, e.g., of the internal condition of the tank, via the electronics and communications circuitry included in the docking station 312, and/or an internal antenna, identifiable as relating to that tank, to the remote central station 306 and/or to other locations. The docking station 312 may contain a circuit board programmed with the protocols for certain alarms or signals relating to predetermined internal and external conditions, and may include a battery for primary or auxiliary power.

In other embodiments, two or more sonar modules may be employed to provide additional beam coverage. Also, various technologies may be implemented to communicate by wireless signal among the gauge 320 and/or the docking station 312 and/or the remote central station 306. Radio frequency (RF) signaling, infrared (IR) signaling, optical signaling, or other similar technologies may be employed to provide communication links. RF signaling, IR signaling, optical signaling, or other similar signaling technologies may also be implemented individually or in any suitable combination for communicating by wireless signal among the gauge 322, the docking station 312, and the remote central station 306.

In other embodiments, wireless signaling technology may incorporate telecommunication schemes (e.g., Bluetooth) to provide point-to-point or multi-point communication connections among the tanks 302, 304 and/or the docking stations 312, 314 and/or the remote central station 306. These telecommunication schemes may be achieved, for example, with local wireless technology, cellular technology, and/or satellite technology. The wireless signaling technology may further incorporate spread spectrum techniques (e.g., frequency hopping) to allow the extinguishers to communicate in areas containing electromagnetic interference. The wireless signaling may also incorporate identification encoding along with encryption/decryption techniques and verification techniques to provide secure data transfers among the devices.

In other embodiments, a Global Positioning System (GPS) may be located on the tank 302 and/or the gauge 322 and/or the docking station 312 and/or the remote central station 306. The GPS may determine, for example, the geographic location of each respective tank and provide location coordinates, via the wireless signaling technology, to the other tanks and/or the remote central stations. Thus, the GPS system may provide the location of the tanks and allow, for example, movement tracking of the tanks.

In still other embodiments, various sensing techniques, besides the sonar modules, may sense objects obstructing access to the tank 302. Similar to sonar, obstructing objects may be detected by passive or active acoustic sensors. In other examples, obstructions may be sensed with electromagnetic sensing techniques (e.g., radar, magnetic field sensors), infrared (IR) sensing techniques (e.g., heat sensors, IR sensors), visual sensing techniques (e.g., photo-electric sensors), and/or laser sensing techniques (e.g., LIDAR sensors). These technologies may, for example, be utilized individually or in concert to sense obstructions that block access to the tank 302.

Figure 6:
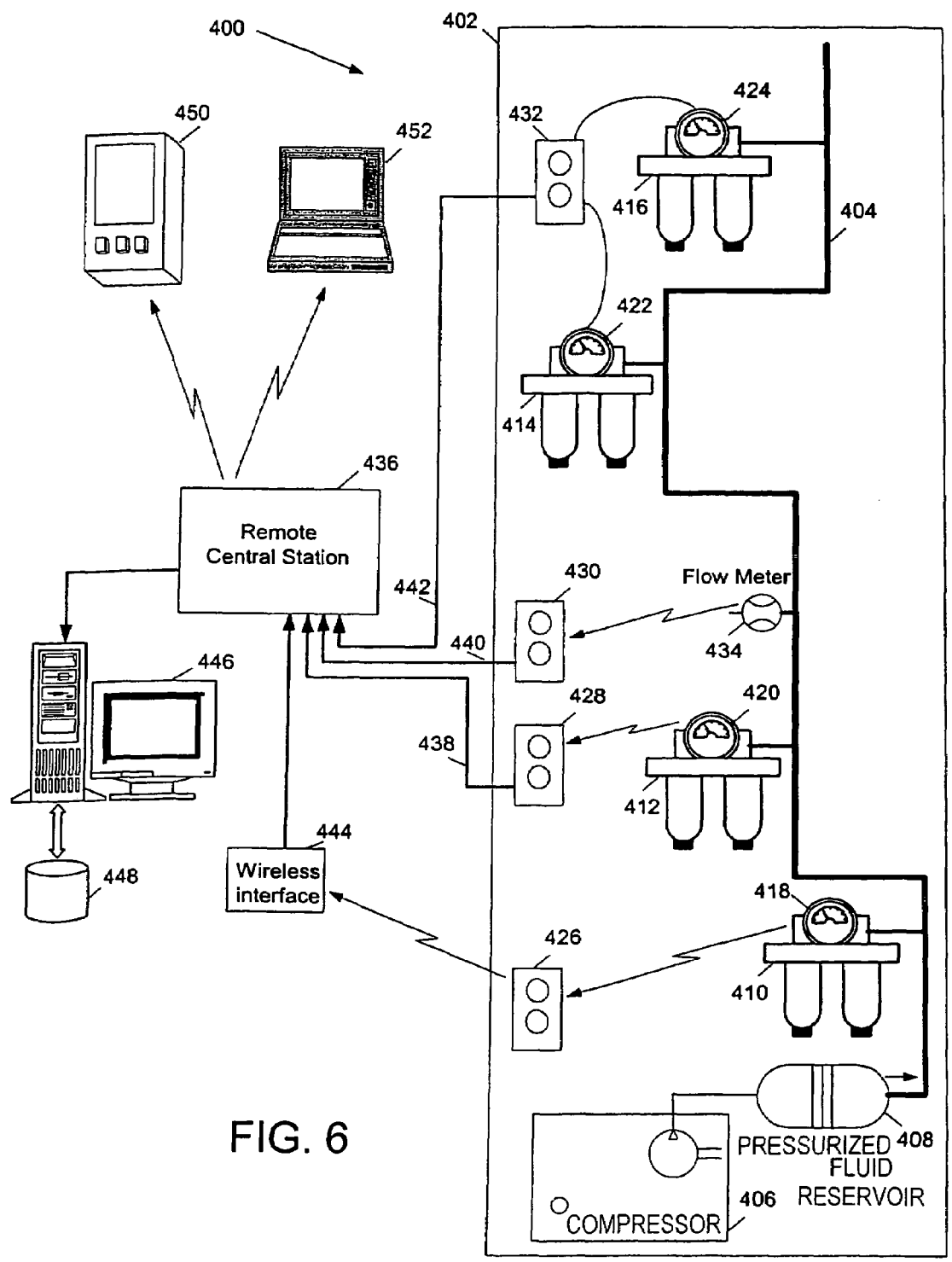
FIG. 6 is a somewhat diagrammatic view of an apparatus for remote inspection of a pipeline in a manufacturing facility.

Referring to FIG. 6, in another implementation, an apparatus 400 provides for remote inspection of fluid flow in a manufacturing plant 402 or other similar facility. In this particular embodiment a fluid such as hydraulic fluid, air, water, oxygen, fuel oil, etc. flows through a pipeline 404 that extends throughout the manufacturing plant 402 for use in manufacturing or other commercial or private enterprises. However, in other embodiments, for example in conjunction with FIG. 3, the pipeline 404 may be extended into one or more of the hospital rooms 102, 104, 106 to provide an oxygen source and replace the need for the respective oxygen tanks 110, 124, 126, 146. Returning to FIG. 6, a compressor 406 is connected to a fluid reservoir 408 for pressuring contained fluid and the pipeline 404 serves as a means to deliver the pressurized fluid to one or more sites within the manufacturing plant 402. As the pipeline 404 extends throughout the manufacturing plant 402 a number of filter units 410, 412, 414, 416 are connected to the pipeline for filtering the pressurized fluid and monitoring the pressure of the fluid carried by the pipeline. Each of the filter units 410, 412, 414, 416 includes a pair of filters and a respective gauge 418, 420, 422, 424 that is similar to the gauges 110, 132, 134, 152 shown in FIG. 3. Also similar to FIG. 3, each of the gauges 418, 420, 422, 424 is in communication with a respective wall-mounted docking station 426, 428, 430, 432 by either an electronic tether or a wireless link. Each of the wall-mounted docking stations 426, 428, 430, 432 receives signals initiated from the respective gauge 418, 420, 422, 424 that contains information such as the pipeline pressure detected by the gauge.

Also, in this particular embodiment a flow meter 434 is connected to the pipeline 404 to measure the flow of fluid through a particular portion of the pipeline. Similar to the gauges 418, 420 included in the filter units 410, 412, the flow meter 434 includes wireless signal transmission and reception circuitry (e.g., an RF circuit, antenna, etc.) to form a wireless link with the docking station 430. Also in some embodiments, similar to the docking stations 114, 136, 144 shown FIG. 3, circuitry included in the docking stations combines the information provided by the respective gauge with external conditions (e.g., an obstruction detected by a sonar module included in the docking stations) monitored at the docking stations. Once combined, signals are transmitted from the docking stations 426, 428, 430, 432 to a remote central station 436. In some embodiments, each docking station 426, 428, 430, 432, gauge 418, 420, 422, 424, or flow meter 434 individually or in combination includes circuitry that encodes identification information in the respective signal to permit the remote central station 436 to differentiate among the filter units 418, 420, 422, 424 or the flow meter 434 as the source of the transmitted signal. Similar to the docking station 136 shown in FIG. 3, the docking station 432 includes circuitry and connections for permitting two of the gauges 422, 424 to each connect to the docking station and for combining (e.g., multiplexing) signals initiated from each of the two gauges prior to transmitting a signal to the remote central station 436. Respective hardwires 438, 440, 442 are used for transmitting respective signals initiated at the docking stations 428, 430, 432 to the central remote station 436. However, the docking station 426 includes wireless signal transmission and reception circuitry (e.g., an RF circuit, antenna, etc.) for initiating wireless signal transmission to a wireless interface 444 connected to the remote central station 436.

Similar to the apparatus 100 shown in FIG. 3, the remote central station 436 includes a computer system 446 that collects and stores, on a storage device 448, information transmitted to the remote central station and processes (e.g., sorts) the received information such that the remote central station can alert personnel to internal conditions (e.g., pressure, flow rate, etc) of the pipeline 404 and external conditions (e.g., access obstructed) associated with one or more of the filter units 410, 412, 414, 416 and the flow meter 434. Once alerted, the personnel can take appropriate steps based on the internal (e.g., inspect the pipeline 404 for a pressure drop) and/or external (e.g., remove obstructions near an obstructed filter unit) conditions detected. Also, similar to the apparatus 100 shown in FIG. 3, the remote central station 436 includes wireless transmission and reception circuitry (e.g., RF circuits, antenna, etc.) for initiating wireless signal transmissions to a PDA 450 and/or a laptop computer 452, or other wireless devices (e.g., a cellular phone) so that personnel can quickly be alerted to the pressure and flow rate along the pipeline 404, obstructions of the filter units 410, 412, 414, 416 or flow meter 434, or other internal and external conditions by using these wireless devices.

Figure 7:
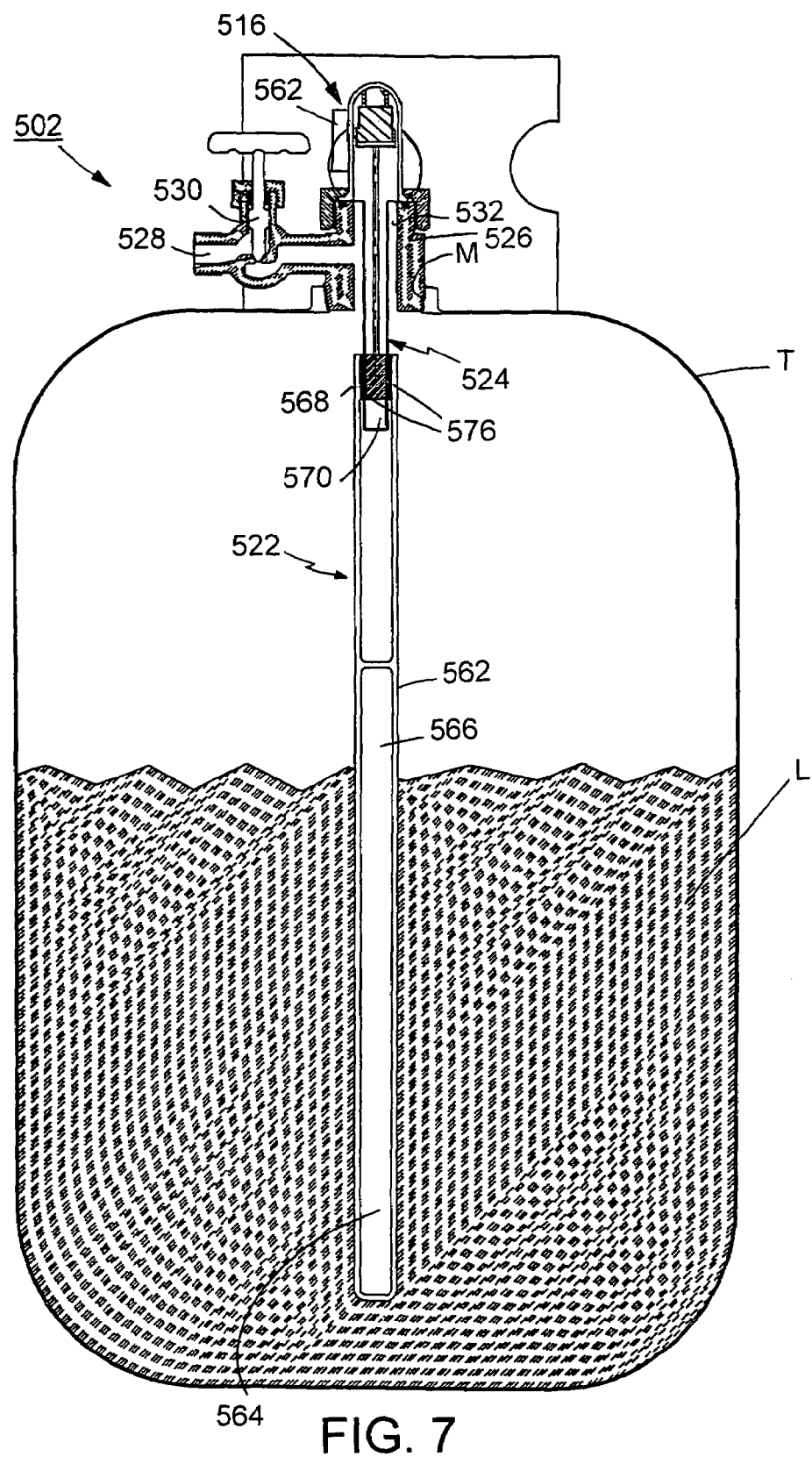
FIG. 7 is a somewhat diagrammatic side section view of a tank, e.g. a propane tank, equipped with a tank liquid level or volume gauge of the invention.
Figure 8:
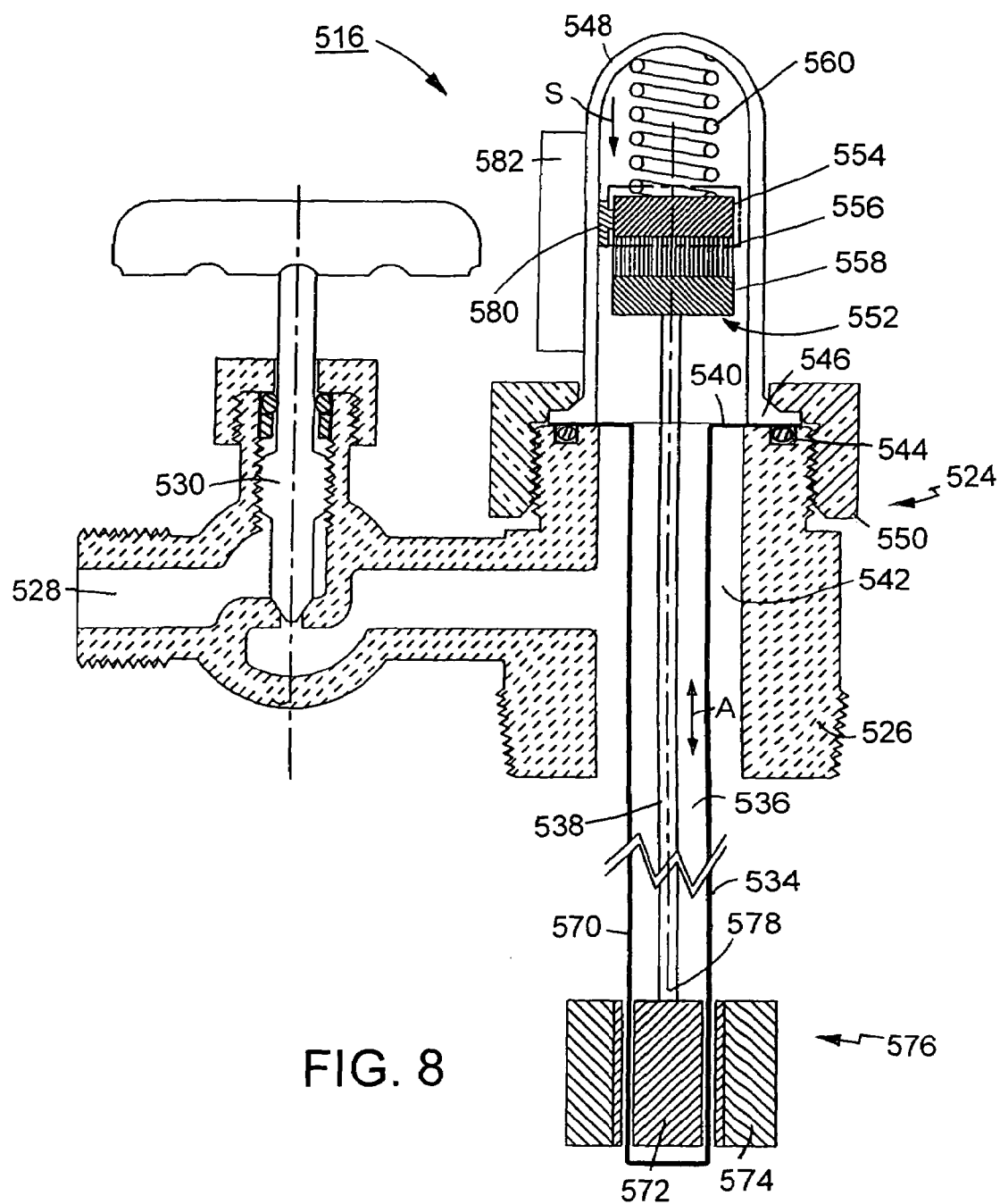
FIG. 8 is an enlarged side section view of the tank liquid level or volume gauge of FIG. 1.

In some implementations, a liquid level of a non-pressurized fluid or a pressurized fluid in a tank may be remotely monitored using techniques described in this disclosure. In FIG. 5, for example, a cooking gas such as propane may be stored in tank 302 and/or tank 304. Propane and other similar volatile materials are often stored in tanks under pressure. Typically, when the tank is full, or near full, and upright, a portion of the material (in the lower section of the tank) is in liquid state and a portion of the material (in the upper section of the tank, adjacent the outlet) is in gaseous state. The ratio of liquid-to-gas depends on a combination of: the mass of material within the tank, the tank volume, the temperature of the contents, and the pressure within the tank. As material is released from the tank in gaseous state for use, the resulting decrease in material mass and lowering of pressure within the tank causes a portion of the liquid contents to change to gaseous state and expand. As a result, the pressure within the tank remains relatively constant until all of the liquid material changes to gas. At that point, with no remaining reservoir of liquid, removal of further gas causes the pressure to drop precipitously, and the tank is soon empty. As such, it is often desirable to monitor the liquid level of the material (e.g., propane) in order to determine when the tank needs to be refilled. FIGS. 7–8 illustrate a liquid level or volume indicator assembly 516 that may be used to monitor the liquid level of tanks (e.g., commercial kitchen tanks 302, 304 in FIG. 5 or a propane tank for an outdoor barbeque grill).

Referring to FIGS. 7–8, a propane tank 502 includes a tank liquid level or volume indicator assembly 516, consisting of a liquid level detector assembly 522 and a liquid volume indicator assembly 524, is mounted to a valve body 526 constructed for threaded engagement with the mouth, M, of the tank, T. The valve body defines a first passageway 528 with an outlet, e.g., for connecting the tank, T, to an cooking device (e.g., a stove, outdoor barbeque grill, etc.), controlled by a valve 530, and a second passageway 532 for receiving the indicator 516.

The indicator assembly 524 (FIG. 8) consists of an elongated, cylindrical indicator body 534 defining a deep drawn well 536, with an indicator shaft 538 mounted for axial movement (arrow, A) therewithin. The body 534 is formed of a non-magnetic material, e.g., stainless steel, and has a flange 540 secured in sealing engagement at the outlet of passageway 542, between o-ring 544 and flange 546 of cover 548, by gland nut 550. The shaft 538 has a color indicator block 552, e.g., with red, yellow and green indicator panels 554, 556, 558, respectively, displayed in turn adjacent a window 560 in cover 548. A return spring 560 applies a downwardly directed biasing force (arrow, S) upon the indicator shaft 538. The indicator assembly 524 also includes a linear displacement transducer 580 and wireless transmitter 528. The wireless transmitter is preferably powered by battery (e.g., Lithium battery), but may be powered via an external power source in other embodiments.

The detector assembly 522 consists of an elongated plastic float tube 562 having a closed, lower end 564, defining a flotation chamber 566, disposed to extend into the volume of liquid, L, within the tank, T. The float tube 562 extends sufficiently far into the tank so that the float tube will continue to float when the liquid has reached a relatively low level, e.g., only enough liquid for less than two hours of operation. The float tube 562 also includes an open, upper end 568 disposed in telescoping, sliding engagement about the lower end 570 of the indicator body 534. Cooperating, coaxial elements 572, 574 of a magnetic coupling 576 (FIG. 8) are mounted, respectively, at the lower end 578 of the indicator shaft 538 and at upper end 568 of the float tube 562. Upper end 568 of the float tube 562 is joined to the magnetic coupling element 574, so that axial movement of the float tube 562 results in axial movement of magnetic coupling element 574. Additional aspects of the liquid level or volume indicator 516 are described in U.S. application Ser. No. 10/024,431, titled "Tank Volatile Liquid Level of Volume Gauge" to James P. O'Shea, the complete disclosure of which is incorporated herein by reference.

In operation, the float tube 562 moves axially in response to the changing level of liquid, e.g., propane, in tank, T, to position the outer magnetic coupling element 574 along the indicator body 534. The magnetic force of the outer coupling element 574 acts upon the inner coupling element 572 through the wall of the indicator body, to position the indicator shaft 538 appropriately. The linear displacement transducer 580 senses movement of the shaft and converts the relative position of the shaft into a digital value, which is transmitted by the wireless transmitter 582 to a remote central station (e.g., remote central station 306 shown in FIG. 5 or display device 504 shown in FIGS. 9–10) via a radio frequency carrier signal. The transducer 518 may be implemented using any known technique or device for converting displacement into an electrical signal such as a linear variable differential transformer (LVDT).

Figure 9:
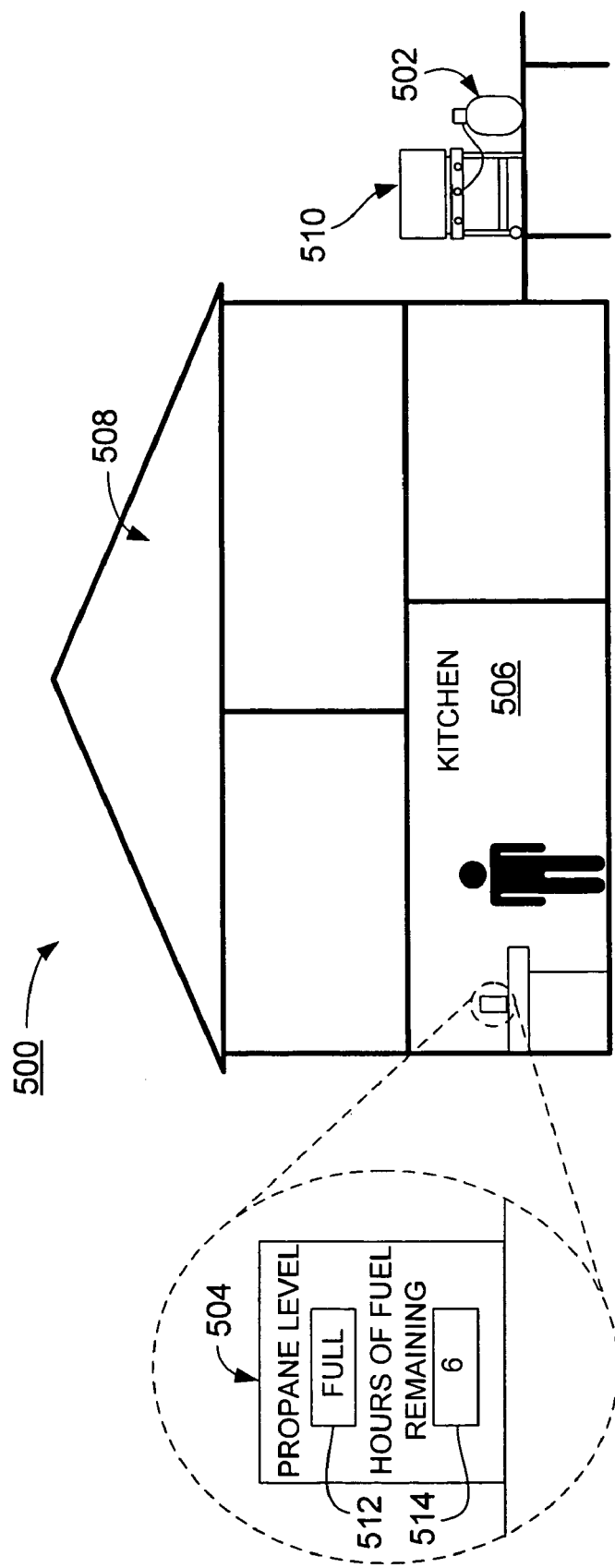
FIGS. 9–10 are somewhat diagrammatic views of a system for remote inspection of a propane tank.
Figure 10:
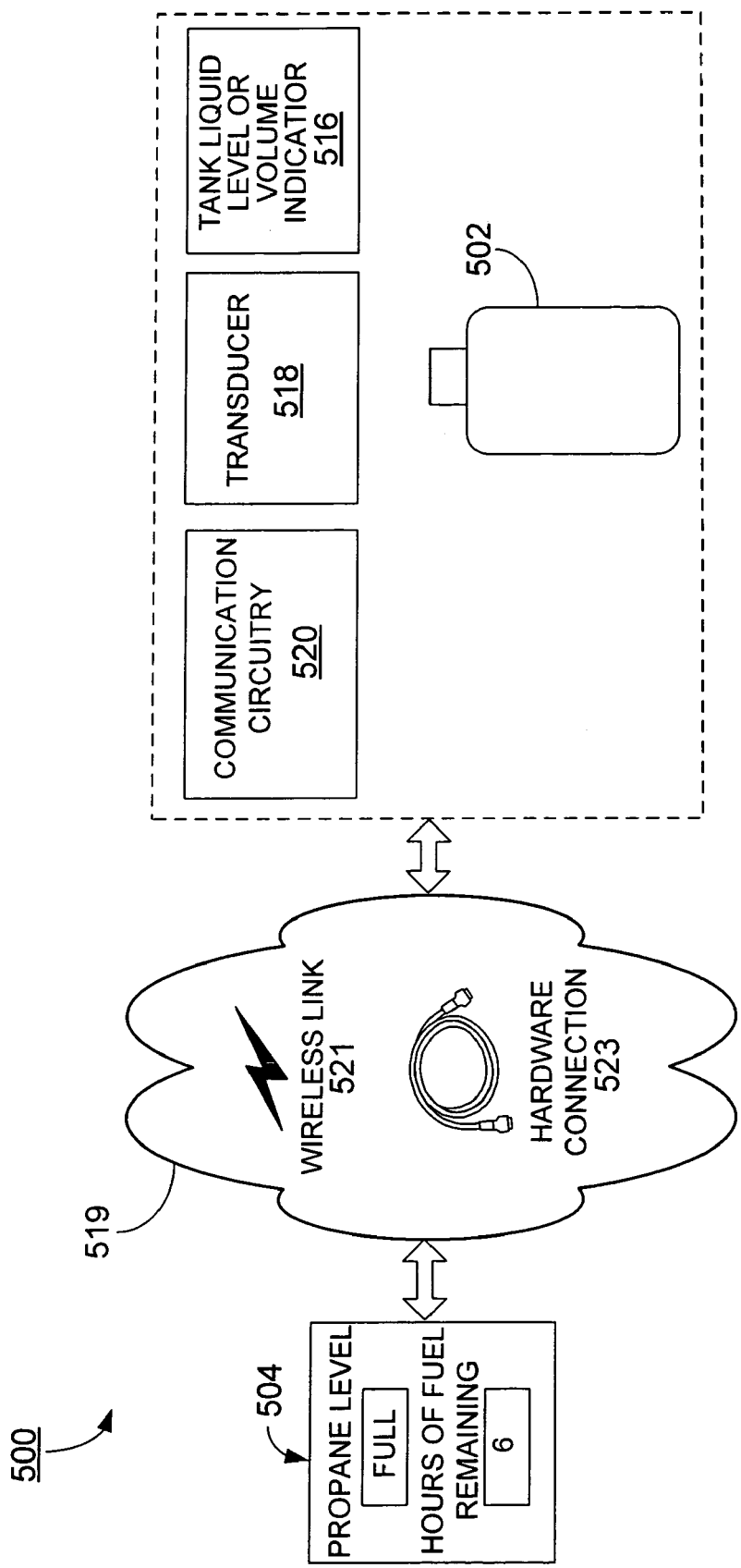

Referring to FIGS. 9–10, in another implementation, a system 500 for remote monitoring of a fluid container includes a portable propane tank 502 that is in communication with a display device 504 located in the kitchen 506 of a house 508. In this particular implementation, the propane tank 502 supplies fuel to a grill 510 located on a deck of the house. The propane tank 502 includes tank liquid level or volume indicator 516, transducer 518, and communications circuit 520 (described above with respect to FIGS. 8–9).

The display device conveniently displays the fuel level 512 and approximate number of hours of fuel remaining 514. The display device may be configured to sit on a flat surface such as a countertop and/or configured to mount to a supporting structure such as a wall. In other implementations, the display device may be a personal data assistant, cellular telephone, or computer.

In operation, the tank liquid level or volume indicator 516 senses the liquid level of the propane stored in the tank. The transducer 518 converts the sensed liquid level to a digital or analog signal which is transmitted to the display device 504 by the communication circuit 520 over a communication link 519 (e.g., a wireless link 521 or a hardwire connection 523). In one implementation, data is transmitted from the tank 502 to the display device using an 433 MHz RF signal. The display device receives the signal containing the digital value of the position of the shaft and converts the value to display a fuel level 512 (FIG. 9) and an approximate number of hours of fuel remaining (FIG. 9) using a lookup table stored in a memory device (e.g., EPROM) located in the display device. Other implementations may include means for monitoring of other internal and/or external conditions such as those described in this disclosure (e.g., lack of presence in an installed position, detection of an obstruction restricting access to the tank, low battery condition, Global Positioning System coordinates of the tank, etc.).

In another implementation, a liquid level gauge for a non-pressurized fluid, such a float gauge for measuring the liquid level of heating oil in a tank, may include a displacement transducer and communication circuit in communication with a remote display device to provide for remote monitoring of the level of a non-pressurized fluid.

Figure 11:
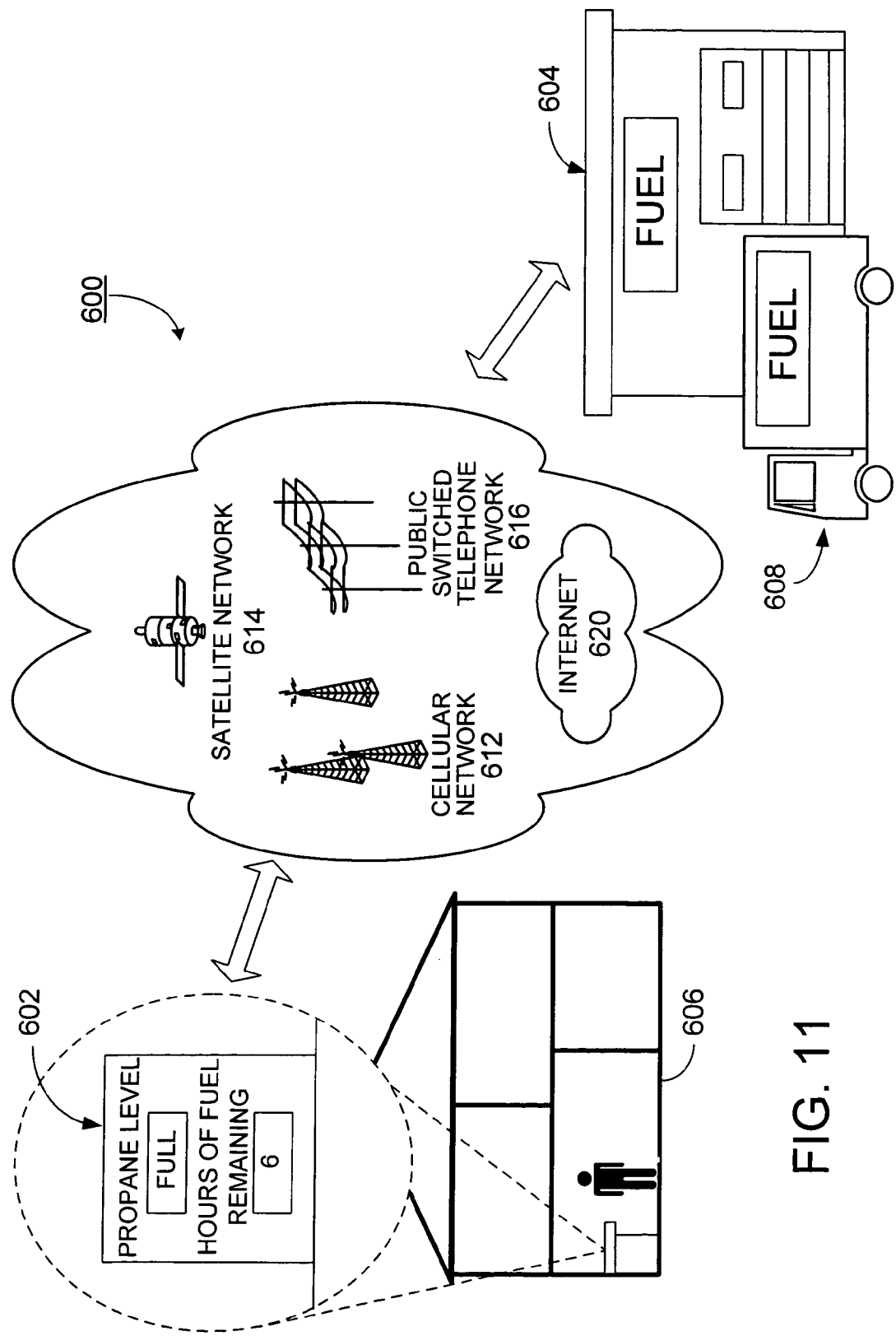
FIG. 11 is a somewhat diagrammatic view of a system for communicating information about a monitored tank to a refueling company.

Referring to FIG. 11, in another implementation, a system 600 for remote monitoring of the liquid level of fuel, a display device 602 located in home 606 includes a communication device (e.g., a modem, cellular modem, network interface card, etc.) (not shown) in communication with another communications device (not shown) at a refueling company 604. In one implementation, when the display device receives a signal from a fuel tank monitor (e.g., tank liquid level or volume indicator assembly 516 shown in FIGS. 7–8) that indicates that the fuel level has dropped below a predetermined threshold, the display device is configured to issue a signal indicating a low fuel condition at home 606 using a communication network 612 such as a cellular network 614, a satellite network 616, a public switched telephone network 618, or a computer network (e.g., Internet 620). Upon receiving such a signal, the refueling company 604 may dispatch a refueling truck 608 to refuel the tank at home 606. In other implementations, the display device is configured to continuously or periodically (e.g., once an hour) transmit a signal to a refueling company that indicates the level of fuel. By monitoring the level of a fuel tank (e.g., a propane tank, a home heating oil tank, etc.), a refueling company can determine when a customer needs additional fuel and avoid premature or late refueling.

Figure 12:
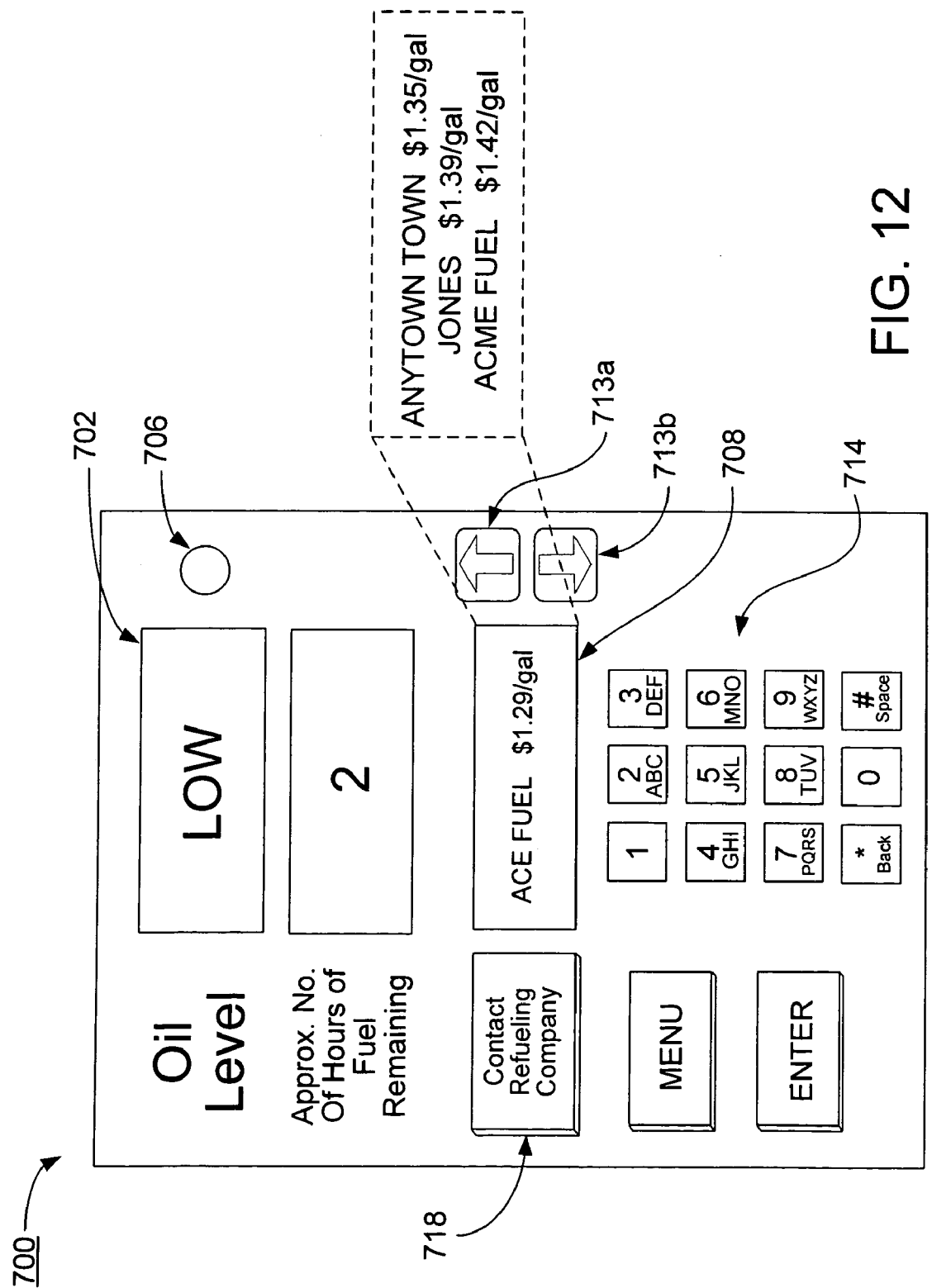
FIG. 12 is a somewhat diagrammatic view of a display device showing information about a monitored tank for home heating oil.

In some configurations, the display device may include an input device, such as a button, switch, graphical user interface, etc., that allows a user to indicate his or her desire to have the display device contact the refueling company for additional fuel. For example, as shown in FIG. 12, a display device 700 is configured to monitor the oil level 702 and approximate number of hours of oil remaining 704 for home heating oil contained in a heating oil tank. The display device 700 includes an LED indicator light 706 that illuminates when the display device receives a signal from a liquid level detector (not shown) indicating that the fuel level is at or below a predetermined threshold (e.g., 2 hours or less of fuel remaining).

The display device 700 also includes a window 708 that displays the name of an available refueling company and its current price per gallon. A user may scroll through a list of refueling companies using up and down scroll buttons 713a, 713b. Information about the name and contact information (e.g., telephone number, facsimile number, URL, etc.) may be programmed by the user using a keypad 714. In other implementations, information about refueling companies may input using a keyboard, graphical user interface, mouse, touchpad, light pen, or other known input devices and/or via a modem or removable memory device such as a diskette, CD-ROM, jump drive, or memory stick. The display device 700 also includes a communications device (e.g., a modem, network interface device, etc.) (not shown) that is in communications device associated with a refueling company. In operation, when the oil level is at or below of predetermined threshold, the display device establishes contact with each of the fuel companies that have been programmed into the display device to download current pricing information (e.g., the price per gallon). The display device also illuminates the low fuel LED indicator and displays the refueling company having the lowest current fuel price. A user may scroll through the list of available refueling companies and instruct the display device to order fuel by pressing the "Contact Refueling Company" button 718. When the display device 700 receives an indication that the user has pressed the "Contact Refueling Company" button 718, the display device 700 establishes contact with a communication device associated with the displayed refueling company (e.g., "Ace Fuel") and places an order for fuel. A user may optionally configure the display device 700 to automatically place an order to a refueling company (e.g. the refueling company having the lowest fuel price) when the display device receives a signal indicating that the fuel is at or below a predetermined threshold.

In this implementation, the display device 700 displays the information (i.e., fuel level, approximate number of hours of fuel remaining, and the refueling company information) using an LED display. Other implementations may use other known means for displaying information to a user, such as a liquid crystal display or a cathode ray tube.

A number of embodiments of the invention have been described. Nevertheless, it will be understood that various modifications may be made without departing from the spirit and scope of the invention. For example, signaling may use networking techniques to provide one-directional and/or multi-directional communications among the devices. In one example, signals may be networked asynchronously, such as in an asynchronous transfer mode (ATM). The signals may also be networked synchronously, such as, for example, in a synchronous optical network (SONET). In still another example, the signals may be transmitted over a landline in an integrated services digital network (ISDN), as well as over other similar media, for example, in a broadband ISDN (BISDN).

Additionally, while a docking station is shown as housing various electronic components in some of the described embodiments, other implementations may not include a separate docking station, but may integrate electronic components (e.g., sonic sensors, communication circuitry, etc.) within the tank itself or assemblies attached to the tank (e.g., a pressure gauge, tank liquid level or volume indicator, flow meter, etc.).

Also, a remote inspection apparatus may be employed for remote inspection of multiple tanks at one or a system of locations. Communication, including wireless communication, or inspection or other information, between the tank and the central station or display device, may be carried on directly, or indirectly, e.g. via signal or relay devices.

Accordingly, other embodiments are within the scope of the following claims.

What is claimed is:

1. Apparatus for remote inspection of a portable tank located in an installed position and adapted to store a liquid material, the apparatus comprising:
   a first detector in communication with the liquid material for measurement of a level of liquid material stored in the portable tank;
   a second detector configured to detect lack of presence of the portable tank from its installed position; and
   an electronic circuit in communication between the first and second detectors and a central station located remotely from the portable tank, the electronic circuit configured to issue a signal to the central station that includes information about the level of liquid material stored in the container or presence of the portable tank in its installed position.

2. The apparatus of claim 1 wherein the electronic circuit is adapted to issue a wireless signal to the central station.

3. The apparatus of claim 1 wherein the electronic circuit is configured to issue a signal to the central station upon detection of a lack of presence of the portable tank from its installed position.

4. The apparatus of claim 1 wherein the electronic circuit is configured to continuously issue a signal to a display device that includes information about the level of liquid material.

5. The apparatus of claim 1 wherein the electronic circuit is configured to periodically issue the signal to the display device.

6. The apparatus of claim 1 wherein the electronic circuit is configured to issue a signal to the display device upon detection of a liquid level at or below a predetermined threshold.

7. The apparatus of claim 1 further comprising a third detector configured to detect presence of an obstruction restricting access to the portable tank.

8. The apparatus of claim 7 wherein the electronic circuit is configured to issue a signal that includes information about the presence of an obstruction restricting access to the portable tank.

9. The apparatus of claim 8 wherein the electronic circuit is configured to issue the signal that includes information about the presence of an obstruction restricting access to the tank upon detection of an obstruction by the third detector.

* * * * *